Patented Feb. 20, 1934

1,947,520

UNITED STATES PATENT OFFICE 1,947,520

METHOD OF PREPARING FOOD PRODUCTS

Bernard J. G. Chiego, Newark, N. J.

No Drawing. Application February 16, 1932
Serial No. 593,412

2 Claims. (Cl. 99—5)

This invention relates to a method of preparing a food product from a given article of food by which the food article is reduced to a finely divided state in a manner which, so far as I am aware, is different from any process heretofore utilized.

In my study of the preparation of finely divided food products, I have found that it has been the practice in the past to chop, grind, or grate the food article, but all of such methods throw out or separate from the food article a large percentage of the juice or moisture therein and are slow and therefore more or less expensive. It is the object of my present invention to provide a method of finely dividing food articles in a better and more expeditious and therefore less expensive manner and one in which the moisture or juices in the food articles are not removed to any great extent, which is essential if a drying operation is not to be performed on the finely divided food product as sometimes required or specified.

My improved process consists in utilizing a finely subdivided brush composed of metal wire of a suitable kind, or bristles provided they are of substantial stiffness. Such a brush may have any desired length; that is, longitudinally of its axis, and of a diameter satisfactory for the food article that is to be finely subdivided. Such a brush may be constructed in various ways, similar to wire scratch brushes now on the market, and as previously pointed out, the diameter is chosen to suit the food article.

For example, I have gotten very satisfactory results in the subdividing of carrots by using a wire brush, the wires being of steel approximately .015" in diameter, and the diameter of the brush being approximately 7", the brush being rotated on the shaft of a motor at a speed near 1800 R. P. M.

For cheese, meats, yeast cakes, cereals, fruits such as bananas, nuts such as cocoanut meat, fish such as cod-fish, the brush may be varied in construction as above set forth.

I have found from my experiments, that the character of the subdivided product may be somewhat altered by varying the pressure of the food article against the rotating brush surface and also by varying the peripheral speed of the rotating brush, and also by varying the stiffness of the brush elements, but for a great many of the food products, such as I have enumerated above, I have determined in an experimental way that brushes from 4" to 7" in diameter, driven at a speed approximately as indicated above, will give very good results over a considerable range of food products, particularly cheese. However, for commercial purposes it is to be understood that the diameter and length of the brushes may be varied over a wide range, and I therefore do not wish to be unduly limited in the interpretation and the scope of the appended claims.

In certain kinds of food articles, such as spinach, it is preferable to wash the article and then compress it more or less before submitting it to the subdividing process.

As the subdivided product leaves the brush, it may be subjected directly to a stream of hot drying air, or the product may pass directly on to a conveyor which will take the product to a drying room or apparatus or elsewhere, but the mechanical arrangements for feeding the food articles to and taking the product away from the brush may be varied over wide limits, depending on the character of the article of food being handled.

Having thus described my invention, what I claim is:

1. The method of preparing a food product which consists in rotating a wire brush having elements of substantial stiffness at a speed best suited to the food article to be operated on, then feeding to the unrestricted peripheral surface of the brush an article of food, whereby the same is finely subdivided by the brush by entire removal from the food article of the particles separated therefrom by the brush, and then drying the product coming from the brush.

2. The method of preparing a food product which consists in providing a brush having its peripheral surface split up into many small contacting members of substantial stiffness, rotating the brush at a speed best suited to the food article to be operated on, then feeding to the peripheral surface of the brush an article of food whereby the same is torn apart into small bits by the brush by entire removal from the food article of the particles separated therefrom by the brush, and then drying the product coming from the brush.

BERNARD J. G. CHIEGO.